US011388746B2

(12) United States Patent
Dudda et al.

(10) Patent No.: US 11,388,746 B2
(45) Date of Patent: *Jul. 12, 2022

(54) METHODS AND APPARATUS FOR UTILIZING SHORT TRANSMISSION TIME INTERVALS IN A WIRELESS COMMUNICATIONS NETWORK

(71) Applicant: Telefonaktiebolaget LM Ericsson (publ), Stockholm (SE)

(72) Inventors: Torsten Dudda, Aachen (DE); Malik Wahaj Arshad, Sigtuna (SE); Henrik Enbuske, Stockholm (SE); Mats Folke, Vällingby (SE); Robert Karlsson, Sundbyberg (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 63 days.

This patent is subject to a terminal disclaimer.

(21) Appl. No.: 16/923,292

(22) Filed: Jul. 8, 2020

(65) Prior Publication Data
US 2020/0344797 A1 Oct. 29, 2020

Related U.S. Application Data

(63) Continuation of application No. 15/765,437, filed as application No. PCT/SE2017/051296 on Dec. 19, 2017, now Pat. No. 10,743,340.
(Continued)

(51) Int. Cl.
*H04L 5/00* (2006.01)
*H04W 72/14* (2009.01)
(Continued)

(52) U.S. Cl.
CPC .......... *H04W 72/14* (2013.01); *H04B 7/2637* (2013.01); *H04L 1/1854* (2013.01);
(Continued)

(58) Field of Classification Search
CPC . H04W 72/12; H04W 72/1278; H04W 72/14; H04W 72/1294; H04W 52/0232;
(Continued)

(56) References Cited

U.S. PATENT DOCUMENTS 10,743,340 B2 * 8/2020 Dudda .................... H04W 4/70
2012/0124263 A1 5/2012 Zhou et al.
(Continued)

FOREIGN PATENT DOCUMENTS

CN 102761967 A 10/2012
CN 102415187 B 7/2014
(Continued)

OTHER PUBLICATIONS

3GPP, "3rd Generation Partnership Project; Technical Specification Group Radio Access Network; Study on New Radio Access Technology; Radio Interface Protocol Aspects (Release 14)", 3GPP TR 38.804 V0.4.0, Nov. 2016, pp. 1-30.
(Continued)

*Primary Examiner* — Salvador E Rivas
(74) *Attorney, Agent, or Firm* — Murphy, Bilak & Homiller, PLLC

(57) ABSTRACT

A terminal device for a wireless communication network is configurable with a plurality of transmission time intervals. An example method comprises: receiving a grant message comprising an indication of radio resources in which the terminal device can transmit one or more wireless messages, the radio resources being configured according to a first transmission time interval of the plurality of transmission time intervals; determining the presence of data to transmit,
(Continued)

the data being associated with a logical channel; determining a maximum transmission time interval associated with the logical channel; and, responsive to a determination that the maximum transmission time interval associated with the logical channel is less than the first transmission time interval, transmitting a scheduling request message. The scheduling request message is configured according to a second transmission time interval of the plurality of transmission time intervals, shorter than the first.

19 Claims, 4 Drawing Sheets

Related U.S. Application Data

(60) Provisional application No. 62/454,115, filed on Feb. 3, 2017.

(51) Int. Cl.
  *H04W 72/04* (2009.01)
  *H04W 72/12* (2009.01)
  *H04W 24/10* (2009.01)
  *H04B 7/26* (2006.01)
  *H04L 1/18* (2006.01)
  *H04L 47/78* (2022.01)
  *H04W 4/70* (2018.01)
  *H04W 28/02* (2009.01)

(52) U.S. Cl.
  CPC ............ *H04L 5/0035* (2013.01); *H04L 47/78* (2013.01); *H04W 4/70* (2018.02); *H04W 24/10* (2013.01); *H04W 28/0278* (2013.01); *H04W 72/0446* (2013.01); *H04W 72/1284* (2013.01); *H04L 5/0007* (2013.01)

(58) Field of Classification Search
  CPC ... H04W 52/0248; H04L 47/78; H04L 5/0035
  See application file for complete search history.

(56) References Cited

U.S. PATENT DOCUMENTS

| | | | |
|---|---|---|---|
| 2014/0328260 A1 | 11/2014 | Papasakellariou et al. | |
| 2014/0376422 A1 | 12/2014 | Dai et al. | |
| 2015/0333893 A1 | 11/2015 | Lee et al. | |
| 2015/0333898 A1 | 11/2015 | Ji et al. | |
| 2015/0334685 A1* | 11/2015 | Ji | H04W 72/1247 370/330 |
| 2015/0334714 A1* | 11/2015 | Wang | H04W 72/0473 370/329 |
| 2016/0119948 A1* | 4/2016 | Damnjanovic | H04L 5/0094 370/280 |
| 2016/0249329 A1 | 8/2016 | Au et al. | |
| 2018/0035427 A1 | 2/2018 | Gupta et al. | |
| 2019/0081744 A1 | 3/2019 | Yang et al. | |
| 2020/0053600 A1* | 2/2020 | Jang | H04W 28/26 |

FOREIGN PATENT DOCUMENTS

| | | | |
|---|---|---|---|
| CN | 104322132 A | 1/2015 | |
| CN | 106416116 A | 2/2017 | |
| RU | 2608950 C1 | 1/2017 | |
| WO | 2012142840 A1 | 10/2012 | |
| WO | 2015179136 A1 | 11/2015 | |
| WO | 2016048082 A1 | 3/2016 | |
| WO | 2016064544 A1 | 4/2016 | |
| WO | 2016130175 A1 | 8/2016 | |
| WO | 2016142979 A1 | 9/2016 | |

OTHER PUBLICATIONS

Unknown, Author, "Impacts on the UL grant and LCP of different numerologies and flexible TTI duration", 3GPP TSG-RAN WG2 #96, Tdoc R2-168659, Reno, Nevada, Nov. 14-18, 2016, pp. 1-4.
Unknown, Author, "New Work Item on shortened TTI and processing time for LTE", 3GPP TSG RAN Meeting #72, RP-161299, Busan, Korea, Jun. 13-16, 2016, pp. 1-9.
Unknown, Author, "sPUCCH resource management", 3GPP TSG-RAN WG1 #87, R1-1611518, Reno, Nevada, Nov. 14-18, 2016, pp. 1-11.
Unknown, Author , "Logical Channel Prioritization with short TTI", 3GPP TSG-RAN WG2 #97 Tdoc R2-1701609, Athens, Greece, Feb. 13-17, 2017, 1-3.
Unknown, Author , "LCP and Scheduling Aspects for Multiple Numerologies", 3GPP TSG-RAN WG2 NR Ad Hoc R2-1700236, Spokane, Washington, Jan. 17-19, 2017, 1-3.

* cited by examiner

METHODS AND APPARATUS FOR UTILIZING SHORT TRANSMISSION TIME INTERVALS IN A WIRELESS COMMUNICATIONS NETWORK

TECHNICAL FIELD

Embodiments of the present disclosure relate to methods and apparatus in a wireless communication network, and particularly to methods and apparatus for enabling low-latency communications between two wireless devices, or between a wireless device and the wireless communication network.

BACKGROUND

Efforts are on-going to develop and standardize communications networks and protocols intended to meet the requirements set out for the fifth generation (5G) of wireless systems, as defined by the Next Generation Mobile Networks Alliance. Such networks are expected to support a large number of use cases, with different use cases having widely different requirements in terms of the service provided by the network.

For example, some use cases may require that data be transmitted and received with extremely low latency, whereas other use cases may have more relaxed latency requirements. In the former category, it is envisaged that future networks may allow for the remote control of machinery, or surgical instruments. In such cases, it is important that data transmitted between the controller (e.g. a surgeon) and the controlled device (e.g. surgical instruments) is reliable and has low latency. A class of communications requiring such performance has been defined as "ultra-reliable and low-latency communications" (URLLC). See, "Study on New Radio Access Technology; Radio Interface Protocol Aspects" (3GPP TR 38.804, v0.4.0). Note that URLLC traffic is applicable in a wide range of use cases not limited to the surgical/machinery examples set out above. Other communications requiring low latency may be critical machine-type communications (C-MTC). Conversely, in the latter category, large-scale sensor networks and other reporting mechanisms for wireless devices may have no need for low latency. For example, massive machine-type communications (M-MTC) may fall within this category.

Thus, in the present Long Term Evolution (LTE) system and also in future systems, there are many different types of services with different corresponding quality of service (QoS). Such services are typically mapped to corresponding logical channels and each logical channel is associated with a preconfigured logical channel priority (LCP). According to the LCP values, a scheduler in the radio access network (RAN) can flexibly allocate the resources to different logical channels in accordance with the LCP values (e.g., allocating resources to logical channels with higher priority before allocating resources to logical channels with lower priority). In this way, high-latency services may be multiplexed with other less latency-dependent services.

Current versions of LTE are based on a repeated frame structure in which a frame comprises 10 subframes, each of 1 ms length and consisting of 14 orthogonal frequency-division multiplexed (OFDM) symbols. In downlink (DL), the first four symbols or fewer in each subframe comprise a control channel (i.e. the physical downlink control channel, PDCCH), while the remaining symbols comprise a data channel (i.e. the physical downlink shared channel, PDSCH). In uplink (UL), all symbols can be used for the transmission of data (i.e. via the physical uplink shared channel, PUSCH), while some symbols may be used for control information (i.e. via the physical uplink control channel, PUCCH) and reference symbols.

In LTE, scheduling and transmission are defined on the timescale of subframes. That is, terminal devices are scheduled to transmit or receive messages using radio resources that are defined in terms of whole subframes. This timescale is often referred to as the transmission time interval (TTI), i.e. the duration of a transmission on the radio link. Thus the standard TTI in LTE is one subframe, or 14 OFDM symbols.

The current solutions for achieving low latency in LTE rely on the LCP values associated with logical channels. However, transmissions are still limited to TTIs which are 14 symbols long.

A method of reducing this latency still further is desirable, particularly for classes of data requiring extremely low latency.

SUMMARY

Apparatus and methods are disclosed that alleviate some or all of the problems discussed above.

Currently, work in 3GPP is ongoing to standardize "short TTI" or "sTTI" operation, where scheduling and transmission can be done on a faster timescale. One way of achieving this is to subdivide the legacy LTE subframe into several sTTI. The supported lengths currently being discussed for sTTI are 2 and 7 OFDM symbols. However, other lengths may be defined in future and the present disclosure is not limited to any particular values of TTI. Data transmission in DL may happen per sTTI via the short PDSCH (or sPDSCH), which may include a control region corresponding to the short PDCCH (or sPDCCH). In UL, data is transmitted per sTTI via the short PUSCH (sPUSCH); control information can be transmitted via the short PUCCH (sPUCCH).

With the introduction of short TTI, which can be scheduled dynamically within regular TTI of 1 ms, data may be transmitted with high or low latency. For overall data delivery, beside the frame duration, also related processing times are important to consider for the overall delivery time.

One aspect of the present disclosure provides a method in a terminal device for a wireless communication network, the terminal device being configurable with a plurality of transmission time intervals. The method comprises: receiving a first grant message from the wireless communication network, the first grant message comprising an indication of first radio resources in which the terminal device can transmit one or more wireless messages, the first radio resources being configured according to a first transmission time interval of the plurality of transmission time intervals; determining the presence of data to transmit, the data being associated with a first logical channel; determining a maximum transmission time interval associated with the first logical channel; and, responsive to a determination that the maximum transmission time interval associated with the logical channel is less than the first transmission time interval, transmitting a scheduling request message to the wireless communication network, the scheduling request message being configured according to a second transmission time interval of the plurality of transmission time intervals, wherein the second transmission time interval is shorter than the first transmission time interval.

Another aspect provides a terminal device for a wireless communication network, the terminal device being configurable with a plurality of transmission time intervals. The terminal device is configured to: receive a first grant message from the wireless communication network, the first grant message comprising an indication of first radio resources in which the terminal device can transmit one or more wireless messages, the first radio resources being configured according to a first transmission time interval of the plurality of transmission time intervals; determine the presence of data to transmit, the data being associated with a first logical channel; determine a maximum transmission time interval associated with the first logical channel; and, responsive to a determination that the maximum transmission time interval associated with the logical channel is less than the first transmission time interval, transmit a scheduling request message to the wireless communication network, the scheduling request message being configured according to a second transmission time interval of the plurality of transmission time intervals, wherein the second transmission time interval is shorter than the first transmission time interval.

A further aspect provides a terminal device for a wireless communication network, the terminal device being configurable with a plurality of transmission time intervals and comprising processing circuitry and a non-transitory computer-readable medium storing instructions which, when executed by the processing circuitry, cause the terminal device to: receive a first grant message from the wireless communication network, the first grant message comprising an indication of first radio resources in which the terminal device can transmit one or more wireless messages, the first radio resources being configured according to a first transmission time interval of the plurality of transmission time intervals; determine the presence of data to transmit, the data being associated with a first logical channel; determine a maximum transmission time interval associated with the first logical channel; and, responsive to a determination that the maximum transmission time interval associated with the logical channel is less than the first transmission time interval, transmit a scheduling request message to the wireless communication network, the scheduling request message being configured according to a second transmission time interval of the plurality of transmission time intervals, wherein the second transmission time interval is shorter than the first transmission time interval.

Another aspect provides a terminal device for a wireless communication network, the terminal device being configurable with a plurality of transmission time intervals and comprising: a first module configured to receive a first grant message from the wireless communication network, the first grant message comprising an indication of first radio resources in which the terminal device can transmit one or more wireless messages, the first radio resources being configured according to a first transmission time interval of the plurality of transmission time intervals; a second module configured to determine the presence of data to transmit, the data being associated with a first logical channel; a third module configured to determine a maximum transmission time interval associated with the first logical channel; and a fourth module configured to, responsive to a determination that the maximum transmission time interval associated with the logical channel is less than the first transmission time interval, transmit a scheduling request message to the wireless communication network, the scheduling request message being configured according to a second transmission time interval of the plurality of transmission time intervals, wherein the second transmission time interval is shorter than the first transmission time interval.

Note that the discussion below focuses on a technical solution for LTE and the developments thereto that are intended to meet the criteria for 5G networks; however, those skilled in the art will appreciate that it is also possible to apply the methods and apparatus described herein to other networks and access technologies.

DETAILED DESCRIPTION

Figure 1:
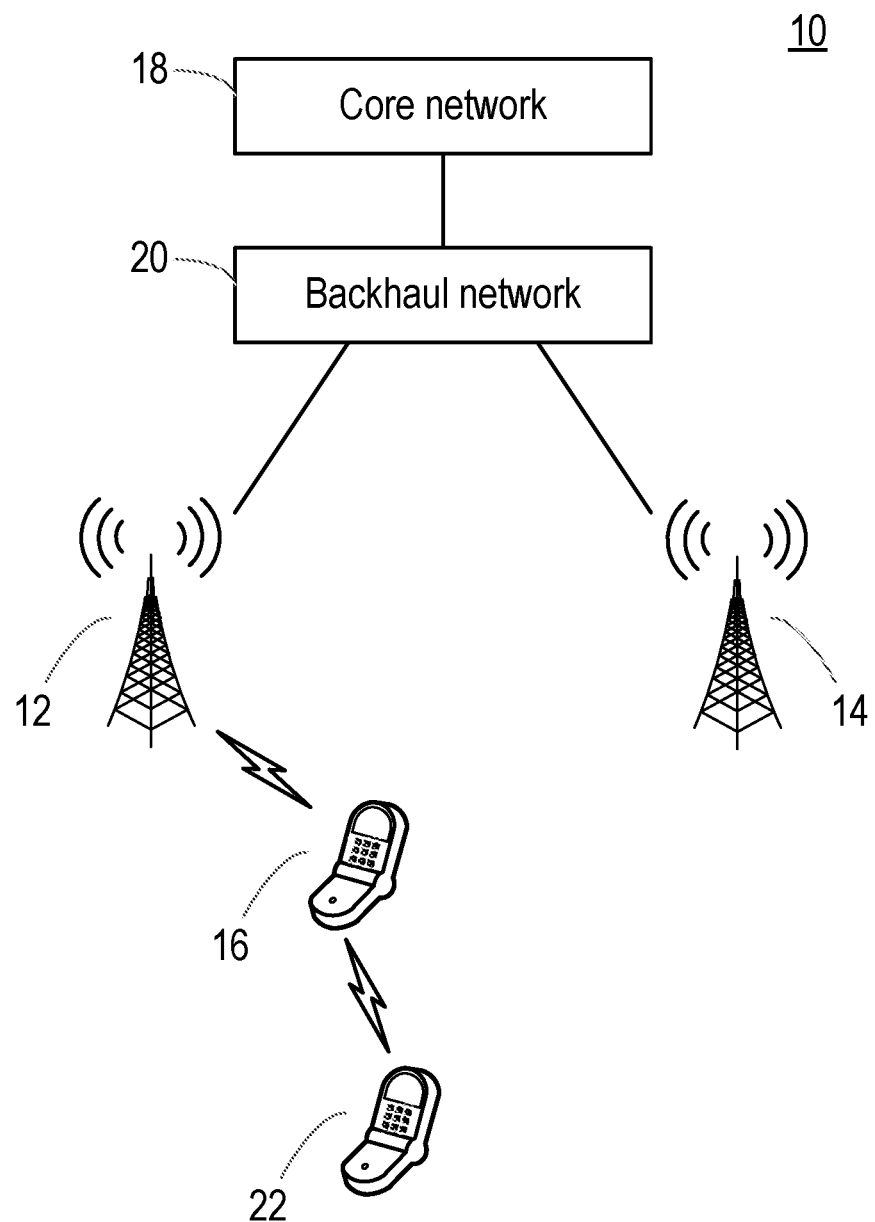
FIG. 1 shows a wireless communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

FIG. 1 shows a network 10 that may be utilized to explain the principles of embodiments of the present disclosure. The network 10 comprises first and second radio access nodes 12, 14 which are connected, via a backhaul network 20, to a core network 18.

The radio access nodes 12, 14 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

A wireless terminal 16 (also referred to as a wireless device, or UE) is in wireless communication with the radio access node 12. For example, the wireless terminal 16 may be camped on a cell which the radio access node 12 serves. Messages transmitted by the wireless terminal 16 to the radio access node 12 are said to be transmitted in the "uplink", while messages transmitted by the radio access node 12 to the wireless terminal 16 are said to be transmitted in the "downlink".

Although not explicitly shown in FIG. 1, the wireless terminal 16 may also be able to communicate wirelessly with the second radio access node 14. For example, the wireless terminal 16 may be configured with dual connectivity, whereby one or more radio bearers are established between the terminal 16 and each of the first and second radio access nodes 12, 14, or whereby one or more radio bearers are split between the first and second radio access nodes 12, 14 (or a combination of both).

Also shown in FIG. 1 is a second wireless terminal 22. The second wireless terminal 22 may be in communication with a radio access node (whether one or both of the radio access nodes 12, 14, or another radio access node not illustrated). However, for present purposes it can be seen that the second wireless terminal 22 is in direct communication with the first wireless terminal 16. Thus the first wireless terminal 16 may also be capable of establishing a direct device-to-device (D2D) communication link with a second wireless terminal 22. Messages transmitted over such a link may be referred to as "sidelink" messages.

In general terms, uplink communications take place as follows. Data is transmitted on the uplink using grants of radio resources from the radio access network (i.e. from a serving radio access node). Upon determining the presence of uplink data in its buffers to be transmitted, a wireless terminal transmits a buffer status report to the radio access node using uplink radio resources previously granted to the wireless terminal. The buffer status report contains an indication of the amount of uplink data to be transmitted. If no uplink radio resources in which to transmit the buffer status report are granted to the terminal, the terminal may first transmit a scheduling request to the radio access node, requesting the grant of radio resources in which to transmit the buffer status report. The radio access node receives and decodes the buffer status report, and schedules resources (e.g. frequencies, time slots and/or orthogonal codes) for the wireless terminal in which to transmit the data in the uplink. The scheduled resources (i.e. an UL grant) are indicated to the wireless terminal in a downlink control message. The wireless terminal can then subsequently utilize the granted resources for the transmission of the data to the radio access network.

As noted above, sidelink communications are direct device-to-device communications between two or more wireless terminals. Sidelink data communications are transmitted using resources selected from a resource pool that is reserved for sidelink transmissions. There are currently two modes of selecting the resources: in transmission mode 1, a serving radio access node selects resources for the transmitting wireless terminal, and communicates those resources via a downlink control message; in transmission mode 2, the transmitting wireless terminal self-selects the resources, e.g. according to rules aimed at minimizing interference. Thus in transmission mode 1, a radio access node may schedule resources for the transmitting wireless terminal to transmit data to a receiving wireless terminal.

It will also be understood by those skilled in the art that radio resources are defined utilizing one or more of: frequencies, time slots, and orthogonal codes. The time over which a wireless terminal is scheduled to transmit or receive a communication (i.e. the time over which a transmission takes place) is known as the transmission time interval (TTI). In current versions of LTE, the TTI is 1 ms (i.e. one subframe) and corresponds to 14 OFDM symbols; however, developments of the LTE standards have introduced new, shorter TTIs of 2 and 7 OFDM symbols. Thus a wireless communications network according to embodiments of the disclosure is operable to configure transmissions (whether uplink, downlink or sidelink) utilizing a plurality of different TTIs; however, the disclosure is not limited to LTE, or the particular values of 2, 7 and 14 OFDM symbols. Rather, any plurality of different TTI values is contemplated.

It is further understood that data to be transmitted by a wireless terminal (whether in the uplink or the sidelink) may be arranged in accordance with one or more logical channels. That is, each data packet to be transmitted may belong to a particular logical channel. Logical channels may be associated with respective qualities of service such that, in general, a first logical channel may require a different quality of service to a second logical channel. The differing quality of service may be implemented by means of respective logical channel priority (LCP) values associated with each logical channel. Data for a logical channel associated with a first, relatively high LCP value may be scheduled for transmission before data for a logical channel associated with a second, relatively low LCP value. That is, data packets may be assigned for transmission in the wireless terminal using available granted resources (whether uplink or sidelink); data packets for a logical channel having the first LCP value are assigned to the available resources before data packets for a logical channel having the second LCP value. If the granted resources are sufficient, the data packets for both logical channels may nonetheless be transmitted using the same radio resources.

According to embodiments of the disclosure, logical channels may further be associated with a maximum TTI value. That is, each logical channel may be associated with a respective maximum TTI value, such that data for each logical channel is transmitted using radio resources that are defined in accordance with a TTI value that is less than or equal to the maximum TTI value associated with the logical channel. Put another way, data for a particular logical channel is not transmitted using resources defined by reference to a TTI that is greater than the maximum TTI associated with the particular logical channel.

Thus logical channels with particularly low latency requirements may be associated with a relatively low maximum TTI value, whereas logical channels with more-relaxed latency requirements may be associated with a relatively high maximum TTI value.

The maximum TTI values, as well as the LCP values and other parameters associated with each logical channel, may be configured via signalling between the radio access network and the wireless terminal, e.g. using radio resource control (RRC) signalling. The configuration of parameters may be static or semi-static. For example, the parameters for a particular logical channel may persist until further notice, or require updating from the radio access network. The parameters may be updated periodically, or on an ad-hoc basis.

Figure 2:
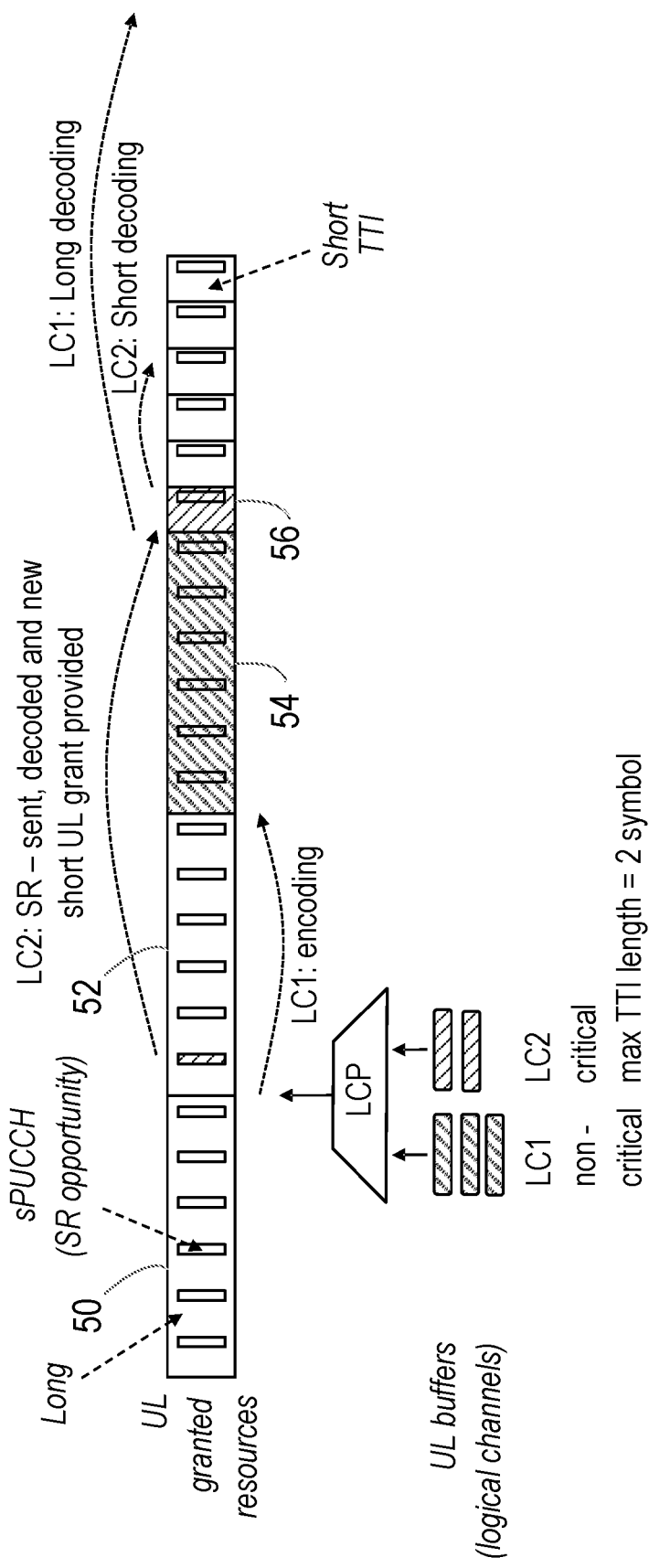
FIG. 2 shows a processing flow according to embodiments of the disclosure.

FIG. 2 shows a processing flow according to embodiments of the disclosure, for the example of transmission over the uplink. The process is equally applicable to sidelink transmissions, however.

The upper part of FIG. 2 shows uplink radio resources that are granted to a particular wireless terminal. Note that the figure shows only the grant of radio resources in the time domain, i.e. horizontally along the page. Frequencies or codes to be used within those granted time slots are not illustrated (and may be consistent or change from time slot to time slot). The lower part of the figure shows data in the UL buffers of the wireless terminal, i.e. data in the buffers of the terminal that is to be transmitted in the uplink.

It can be seen that a first period 50 of radio resources granted to the wireless terminal has a relatively long TTI, e.g. 14 OFDM symbols. However, within the period 50, one or more transmission opportunities are defined having shorter TTI than the overall period. These transmission opportunities correspond to control transmission opportunities for the wireless terminal to transmit control information to the radio access node using a shorter TTI. For example, the opportunities may correspond to short PUCCH opportunities.

In the illustrated embodiment, six short transmission opportunities are shown in the long TTI 50; however, in general, any number of short transmission opportunities may be provided for in the long TTI 50.

At the end of the time period 50, and the beginning of a subsequent period 52, the wireless terminal determines the presence of data in its UL data buffers. The data comprises data for a first logical channel LC1 and a second logical channel LC2, associated with respective logical channel priority values. In this example, logical channel LC2 is associated with a higher priority value than logical channel LC1

The logical channels are further associated with respective maximum TTI values. In the illustrated example, the first logical channel is associated with a first maximum TTI value, e.g. 14 OFDM symbols or longer, whereas the second logical channel is associated with a shorter maximum TTI value, e.g. 2 OFDM symbols. In this way, the data associated with the second logical channel may be identified as requiring lower latency than the data associated with the first logical channel.

At this point in time, the wireless terminal is granted only radio resources associated with a relatively long TTI, e.g. 14 OFDM symbols. According to embodiments of the disclosure, upon determining that the maximum TTI of the second logical channel is shorter than the TTI associated with available granted resources (or upon determining that no resources have been granted), the wireless terminal transmits a control message requesting the grant of resources associated with a TTI that is equal to or shorter than the maximum TTI value associated with the second logical channel. For example, the control message may comprise a scheduling request message transmitted over an uplink control channel. The control message may be transmitted using one or more of the short transmission opportunities defined within the longer TTI, and thus, in one example, the control message is transmitted as a scheduling request over the sPUCCH.

In the illustrated embodiment, the control message is transmitted using the first-available short transmission opportunity upon detection, and such embodiments serve to keep latency for the second logical channel low. However, in other embodiments it may not be possible to transmit the control message immediately upon detection of the data in the buffers, and thus a short delay is possible until a subsequent transmission opportunity.

The first logical channel is associated with a maximum TTI value that is equal to or longer than the TTI associated with resources already granted to the wireless terminal. Thus, the data for the first logical channel can be transmitted using the available granted resources. The data is encoded (which it is assumed will take one TTI) during the period 52, and transmitted in the next-available granted period 54. Upon receipt by the receiving device (whether that is the radio access node in the uplink, or another wireless terminal in the sidelink), the data is decoded and this will take a relatively long time owing to the larger amount of data that is transmitted using the longer TTI.

Upon receipt of the control message transmitted in period 52, the radio access node decodes the message and provides a new grant of radio resources for the wireless terminal, configured with a TTI value that is equal to or shorter than the maximum TTI value associated with the second logical channel. These resources are shown in FIG. 2 as period 56 and subsequent periods.

Thus the data associated with the second logical channel is encoded and, in period 56, transmitted to the receiving device using the shorter TTI. As relatively less data is transmitted in the shorter TTI period 56 than the longer TTI periods 50, 52, 54, the receiving device requires less time to decode the transmission. Thus, even though the data for the second logical channel may be transmitted after the data for the first logical channel, it is nonetheless received and available earlier in the receiving device.

Figure 3:
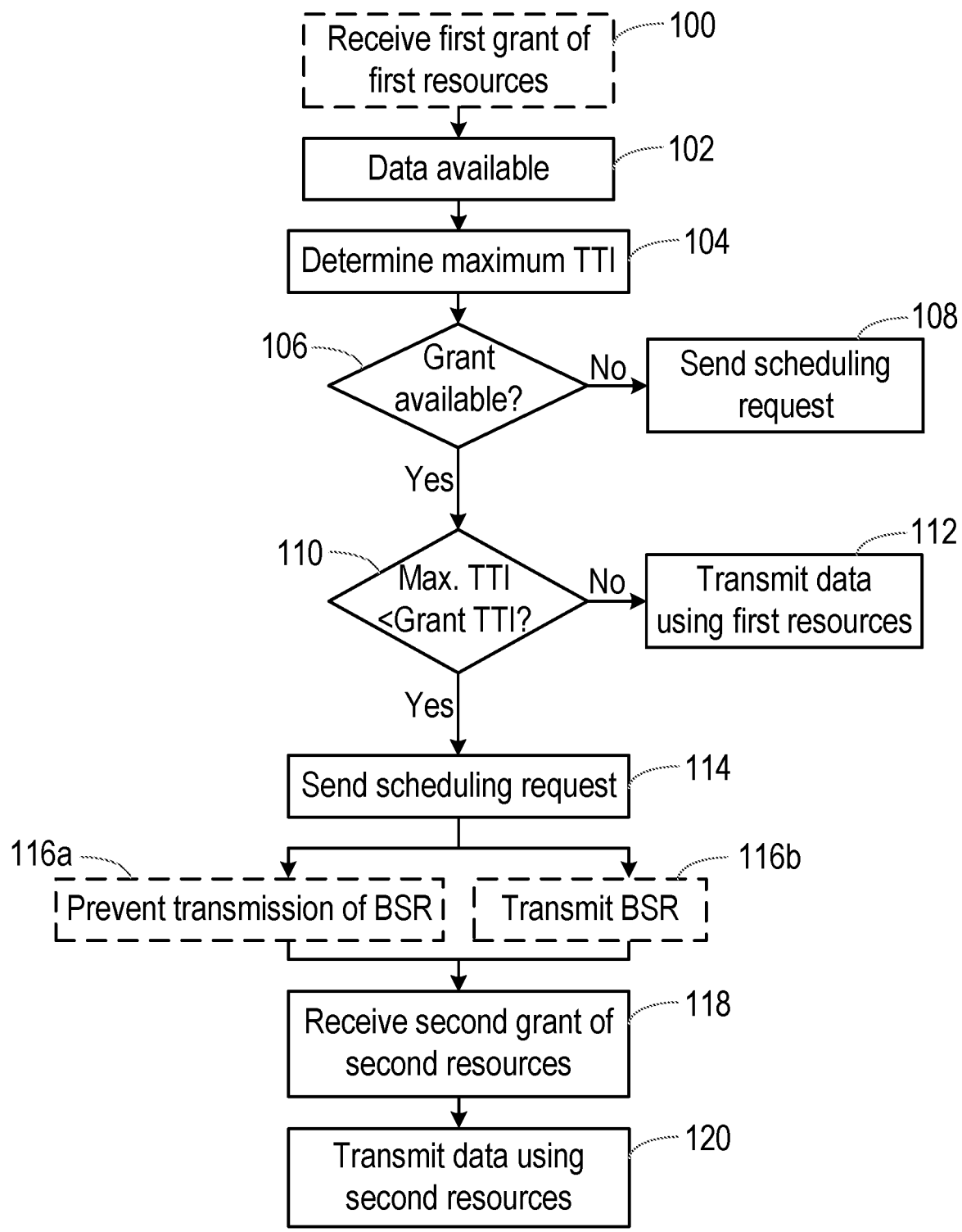
FIG. 3 is a flow chart of a method according to embodiments of the disclosure.

FIG. 3 is a flowchart of a method according to embodiments of the disclosure. The method may be carried out in a wireless terminal, such as the wireless terminal 16 shown in FIG. 1, for example.

In an optional step 100, the wireless terminal receives, from a radio access node, a first grant of first radio resources on which to transmit one or more wireless messages. For example, the radio access node may be a serving radio access node, such as a nodeB, an eNodeB, or similar. The message comprising the first grant may be a control message transmitted on a downlink control channel (e.g. PDCCH or sPDCCH) comprising an indication of radio resources which are granted to the wireless terminal. For example, the control message may comprise downlink control information (DCI) configured in a particular format, e.g. DCI Format 0, to convey an indication of the resources that are granted to the wireless terminal.

The control message may grant resources for the transmission of wireless messages in the uplink (i.e. from the wireless terminal to the radio access node) or in the sidelink (i.e. from the wireless terminal directly to another wireless terminal).

The first radio resources may comprise one or more frequencies (e.g. one or more frequency sub-channels), one or more time slots, one or more orthogonal codes used to encode the transmissions, or any combination thereof. For example, the radio resources may be defined using physical resource blocks corresponding to particular time slots and frequencies. The resources, and particularly the time slots, may be associated with a particular TTI value. The TTI value may be explicitly indicated in the control message containing the grant, or implicitly known to the wireless terminal based, for example, on a current mode of operation of the wireless terminal, or a format of the control message containing the grant (i.e. where different formats correspond to different TTI values).

In step 102, the wireless terminal determines that it has data available for transmission (i.e. in the uplink or sidelink). For example, the wireless terminal may comprise one or more buffers in which data is temporarily stored prior to being encoded and transmitted. Such data may arise as a result of some user action (e.g. instigating a call, or accessing a data service), or an automated process within the wireless terminal.

The data is associated with one or more logical channels and, in step 104, the wireless terminal determines a maximum TTI value associated with the logical channels. The logical channels and their associated parameters (e.g. maximum TTI value, logical channel priority, etc) may be configured via signalling between the radio access network and the wireless terminal, e.g. using radio resource control (RRC) signalling. The configuration of parameters may be static or semi-static. For example, the parameters for a particular logical channel may persist until further notice, or require updating from the radio access network. The parameters may be updated periodically, or on an ad-hoc basis. Thus step 104 may comprise receiving configuration data for the logical channel from the radio access network; however, it is expected that such configuration data will have been received previously and stored locally in the wireless terminal.

In step 106, the wireless terminal determines whether any granted radio resources are available (i.e. whether any radio resources have been granted to the wireless terminal, and/or whether such radio resources are still available and not allocated for the transmission of other data).

If no resources are available, the method proceeds to step 108, in which the wireless terminal transmits a control message (e.g. a scheduling request) to the radio access node requesting the grant of radio resources in which to transmit the data. Thus the control message may request the grant of radio resources associated with a TTI that is equal to or shorter than the maximum TTI value determined in step 104. For example, the control message may comprise an explicit or implicit indication of the maximum TTI value (in the latter case, the maximum TTI value may be implicitly indicated by a formatting of the control message, for example, or the radio access node may be able to determine the maximum TTI value by reference to one or more other parameters contained within the control message).

For example, the control message may be transmitted over an uplink control channel. The control message may be transmitted using one or more short transmission opportunities preconfigured in the wireless terminal (e.g. via signalling with the radio access network) and identified as an uplink control channel. In one example, the control message is transmitted as a scheduling request over the sPUCCH.

If it is determined in step 106 that resources have been granted to the wireless terminal and are available, the method proceeds to step 110 in which the wireless terminal determines whether the maximum TTI value determined in step 104 is less than the TTI value associated with the granted resources. If the maximum TTI value is not less than the granted TTI (i.e. it is equal to or greater than the TTI associated with the granted resources), the granted resources can be used to transmit the data. Thus, in step 112, the data is encoded and then transmitted using the granted resources (e.g. the resources granted in step 100).

Step 108 may comprise allocating the data to the available resources in accordance with a logical channel priority value associated with the logical channel for the data. That is, data associated with logical channels having a relatively high priority (i.e. having a relatively high logical channel priority value) may be allocated to the available resources before data associated with logical channels having a relatively low priority (i.e. having a relatively low logical channel priority value).

If it is determined in step 110 that the maximum TTI value is less than the TTI associated with the granted resources, the method proceeds to step 114, in which the wireless terminal transmits a control message (e.g. a scheduling request) to the radio access node requesting the grant of radio resources in which to transmit the data. This step may be essentially the same as step 108, for example. Thus the control message may request the grant of radio resources associated with a TTI that is equal to or shorter than the maximum TTI value determined in step 104. For example, the control message may comprise an explicit or implicit indication of the maximum TTI value (in the latter case, the maximum TTI value may be implicitly indicated by a formatting of the control message, for example, or the radio access node may be able to determine the maximum TTI value by reference to one or more other parameters contained within the control message).

For example, the control message may be transmitted over an uplink control channel. The control message may be transmitted using one or more short transmission opportunities, and thus, in one example, the control message is transmitted as a scheduling request over the sPUCCH.

In step 118, the wireless terminal receives from the radio access node a second grant of second radio resources on which to transmit the data identified in step 102. The message comprising the second grant may be a control message transmitted on a downlink control channel (e.g. PDCCH or sPDCCH) comprising an indication of radio resources which are granted to the wireless terminal. For example, the control message may comprise downlink control information (DCI) configured in a particular format, e.g. DCI Format 0, to convey an indication of the resources that are granted to the wireless terminal.

The control message may grant resources for the transmission of wireless messages in the uplink (i.e. from the wireless terminal to the radio access node) or in the sidelink (i.e. from the wireless terminal directly to another wireless terminal).

The second radio resources may comprise one or more frequencies (e.g. one or more frequency sub-channels), one or more time slots, one or more orthogonal codes used to encode the transmissions, or any combination thereof. For example, the radio resources may be defined using physical resource blocks corresponding to particular time slots and frequencies. The resources, and particularly the time slots, may be associated with a particular TTI value. The TTI value may be explicitly indicated in the control message containing the grant, or implicitly known to the wireless terminal based, for example, on a current mode of operation of the wireless terminal, or a format of the control message containing the grant (i.e. where different formats correspond to different TTI values).

In accordance with the scheduling request transmitted in step 114, the second resources are configured with respect to a TTI value that is shorter than or equal to the maximum TTI value for the logical channel associated with the data in step 102.

In step 120, the wireless terminal encodes the data and, using the second resources identified in the message received in step 118, transmit the data.

As noted above, the conventional response to the detection of data available to transmit is to transmit a buffer status report (BSR) indicating the amount of data that is available to transmit. A BSR may be transmitted as a control element in the media access control (MAC) layer, and may be transmitted periodically (i.e. indicating a current amount of data that is available for transmission) or non-periodically (i.e. when data is available for transmission, or no data is available for transmission).

According to embodiments of the disclosure, the transmission of a scheduling request in step 114 can replace these conventional steps or be in addition to them. Thus, in one embodiment, after step 114 the method proceeds to step 116a in which no BSR is transmitted in respect of the data identified in step 102. For example, the wireless terminal may be pre-configured to prevent transmission of a BSR in the event that the maximum TTI value associated with data available to transmit is shorter than the TTI associated with any granted radio resources, and a scheduling request has been transmitted for further resources configured with a shorter TTI. In such embodiments, the network receives a single request for radio resources and respond accordingly.

In an alternative embodiment, after step 114 the method proceeds to step 116b in which a BSR is transmitted in respect of the data identified in step 102. In this case, the radio access node effectively receives two requests—via different mechanisms—to schedule radio resources for the transmission of the data identified in step 102. The scheduling request transmitted in step 114 may be received and acted upon first by granting the second resources described above (especially if transmitted using a short transmission opportunity). However, the radio access node may take account of the grant of second resources when responding to the BSR transmitted in step 116b. If the BSR indicates a relatively small amount of data, e.g. that could be entirely transmitted using the resources granted in step 118, the radio access node may ignore the BSR transmitted in step 116b. If the BSR indicates a greater amount of data than could be transmitted using the resources granted in step 118, the radio access node may grant further resources for the wireless terminal in which to transmit the remainder of the data.

It will be apparent to those skilled in the art that, although the description above has focussed on a process flow for data belonging to a single logical channel, the method shown in FIG. 3 may be applied continuously for all data that becomes available for transmission. For example, data associated with multiple different logical channels may become available for transmission simultaneously, or nearly simultaneously. In that case, separate instances of the method may be carried out in respect of each logical channel in parallel. Thus, a scheduling request message may be transmitted in respect of data for a logical channel associated with a relatively short maximum TTI value (e.g. as shown in step 114), simultaneous with the transmission of data for a logical channel associated with a relatively long maximum TTI value (e.g. as shown in step 112).

It will be apparent from the discussion above that embodiments of the disclosure provide a method for reducing the latency of urgent wireless communications. This is further apparent from the following examples.

Example 1

Example 1 corresponds to a first example of conventional behaviour, in which a wireless terminal transmits a buffer status report following a determination that data is available for transmission, and is subsequently granted resources having a short TTI. Here we assume that a "long" TTI has 14 OFDM symbols, and is associated with 1 TTI encoding time and 2 TTI decoding time; while a "short" has 2 OFDM symbols, and is associated with 2 TTI encoding time and 3 TTI decoding time.

Wireless terminal determines the presence of data to transmit and waits for the next long TTI (1-14 os)
Wireless terminal encodes BSR (assumed zero delay)
Wireless terminal sends BSR on the physical uplink shared channel, PUSCH (14 os)
Radio access node decodes BSR (2*14 os)
Radio access node encodes a short UL grant (2*2 os)
Radio access node transmits short UL grant on sPDCCH (2 os)
Wireless terminal decodes UL grant and encodes data for transmission (5*2 os)
Wireless terminal transmits UL data (2 os)
Radio access node decodes UL data (3*2 os)

This leads to an overall latency of between 67 and 80 OFDM symbols.

Example 2

Example 2 corresponds to a second example of conventional behaviour, in which a wireless terminal transmits the data using resources previously granted, and configured according to a "long" TTI.
- Wireless terminal determined the presence of data to transmit and waits for the next long TTI (1-14 os)
- Wireless terminal encodes UL data (1*14 os)
- Wireless terminal transmits UL data (1*14 os)
- Radio access node decodes UL data (2*14 os)

This leads to an overall latency of between 57 and 70 OFDM symbols.

Example 3

Example 3 corresponds to the behaviour described above with respect to FIG. 3, in the event that there are no available granted resources, or the available granted resources are configured with a TTI value that is greater than the maximum TTI value for the data being transmitted.
- Wireless terminal determines the presence of data to transmit and waits for the next short TTI (1-4 os)
- Wireless terminal encodes scheduling request (assumed zero delay)
- Wireless terminal sends the scheduling request on the sPUCCH (2 os)
- Radio access node decodes BSR (3*2 os)
- Radio access node encodes a short UL grant (2*2 os)
- Radio access node transmits short UL grant on sPDCCH (2 os)
- Wireless terminal decodes UL grant and encodes data for transmission (5*2 os)
- Wireless terminal transmits UL data (2 os)
- Radio access node decodes UL data (3*2 os)

This leads to an overall latency of between 33 and 36 OFDM symbols.

Figure 4:
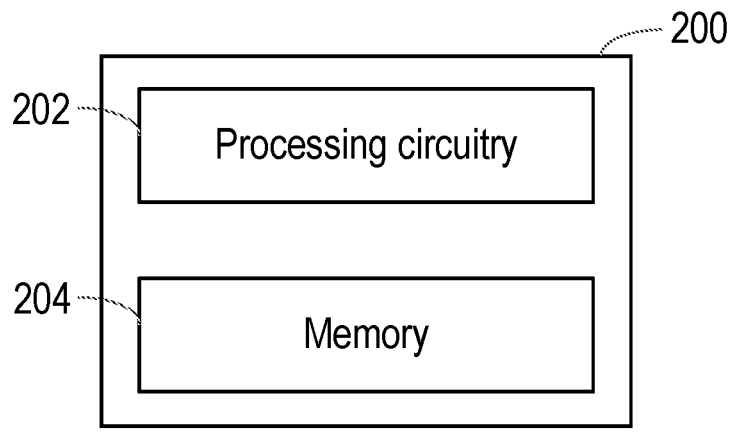
FIG. 4 is a schematic diagram of a wireless terminal device according to embodiments of the disclosure.

FIG. 4 is a schematic drawing of a wireless terminal 200 according to embodiments of the disclosure. The wireless terminal 200 may be suitable for carrying out the method described above, and particularly with respect to FIG. 3, for example.

The terminal 200 comprises processing circuitry 202 and a non-transitory computer-readable medium 204 (such as memory) communicatively coupled to the processing circuitry 202. The wireless terminal 200 may be operable within a wireless communication network, and configurable with a plurality of transmission time intervals.

In one embodiment, the medium 204 stores instructions which, when executed by the processing circuitry 202, cause the terminal 200 to: receive a first grant message from the wireless communication network, the first grant message comprising an indication of first radio resources in which the terminal device can transmit one or more wireless messages, the first radio resources being configured according to a first transmission time interval of the plurality of transmission time intervals; determine the presence of data to transmit, the data being associated with a first logical channel; determine a maximum transmission time interval associated with the first logical channel; and responsive to a determination that the maximum transmission time interval associated with the logical channel is less than the first transmission time interval, transmit a scheduling request message to the wireless communication network, the scheduling request message being configured according to a second transmission time interval of the plurality of transmission time intervals, wherein the second transmission time interval is shorter than the first transmission time interval.

In further embodiments, the terminal 200 may comprise hardware for transmitting wireless signals (not illustrated), e.g. one or more antennas, and corresponding transceiver circuitry, coupled to the processing circuitry 202 and/or the memory 204.

Figure 5:
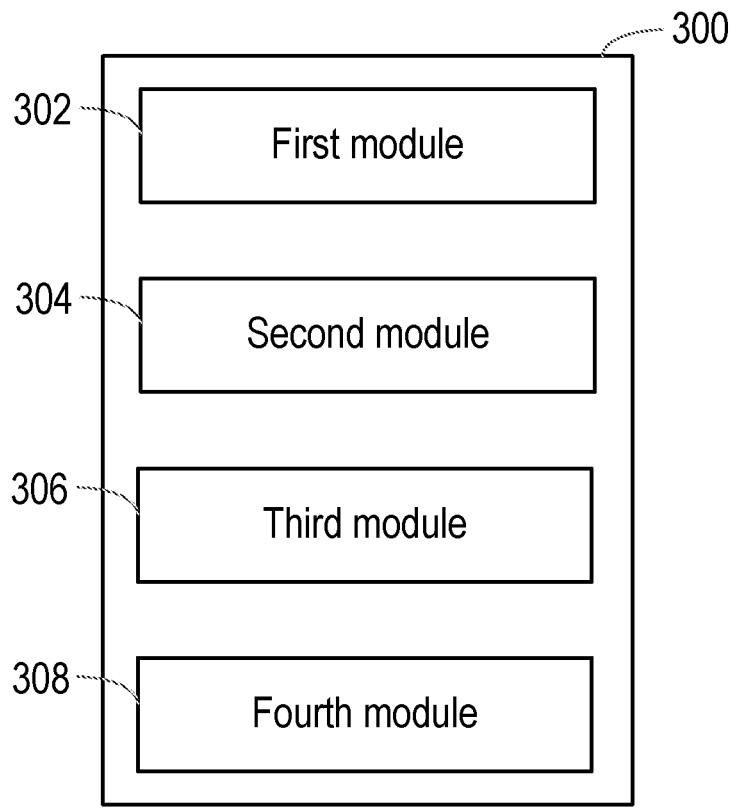
FIG. 5 is a schematic diagram of a wireless terminal device according to further embodiments of the disclosure.

FIG. 5 is a schematic drawing of a wireless terminal 300 according to embodiments of the disclosure. The wireless terminal 300 may be suitable for carrying out the method described above, and particularly with respect to FIG. 3, for example.

The terminal 300 comprises a first module 302, a second module 304, a third module 306 and a fourth module 308. The wireless terminal 300 may be operable within a wireless communication network, and configurable with a plurality of transmission time intervals.

In one embodiment, the first module 302 is configured to receive a first grant message from the wireless communication network, the first grant message comprising an indication of first radio resources in which the terminal device can transmit one or more wireless messages, the first radio resources being configured according to a first transmission time interval of the plurality of transmission time intervals. The second module 304 is configured to determine the presence of data to transmit, the data being associated with a first logical channel. The third module 306 is configured to determine a maximum transmission time interval associated with the first logical channel. The fourth module 308 is configured to, responsive to a determination that the maximum transmission time interval associated with the logical channel is less than the first transmission time interval, transmit a scheduling request message to the wireless communication network, the scheduling request message being configured according to a second transmission time interval of the plurality of transmission time intervals, wherein the second transmission time interval is shorter than the first transmission time interval.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

What is claimed is:

1. A method in a terminal device for a wireless communication network, the terminal device being configurable with a plurality of transmission time intervals, the method comprising:
   determining a maximum transmission time interval associated with a first logical channel of a plurality of logical channels; and
   responsive to a determination that the maximum transmission time interval associated with the first logical channel is less than a first transmission time interval associated with first radio resources, transmitting a scheduling request message to the wireless communication network, the scheduling request message being configured according to a second transmission time interval of the plurality of transmission time intervals, wherein the second transmission time interval is shorter than the first transmission time interval.

2. The method of claim 1, further comprising receiving a first grant message from the wireless network, prior to said determining, the first grant message indicating the first radio resources.

3. The method of claim 1, further comprising:
receiving a second grant message from the wireless communication network, subsequent to said transmitting, the second grant message indicating second radio resources on which the terminal device can transmit one or more wireless messages, the second radio resources being configured according to a transmission time interval shorter than the first transmission time interval; and
transmitting data using the second radio resources.

4. The method of claim 3, wherein the second radio resources are configured according to the second transmission time interval.

5. The method of claim 1, wherein the scheduling request message is transmitted via a control channel.

6. The method of claim 5, wherein the control channel is a short control channel.

7. The method of claim 5, wherein the control channel is an uplink control channel.

8. The method of claim 1, further comprising:
responsive to a determination that the maximum transmission time interval associated with the first logical channel is less than the first transmission time interval, not transmitting a buffer status report for data associated with the first logical channel using the first radio resources.

9. The method of claim 1, further comprising:
responsive to a determination that the maximum transmission time interval associated with the first logical channel is less than the first transmission time interval, transmitting a buffer status report for the data associated with the first logical channel using the first radio resources.

10. The method of claim 1, wherein the first radio resources comprise one or more of: one or more transmission frequencies, one or more transmission time slots, and one or more orthogonal codes for encoding.

11. The method of claim 1, wherein the first radio resources comprise radio resources for the transmission of one or more sidelink messages to another terminal device.

12. The method of claim 1, wherein an association between logical channels and maximum transmission time intervals is pre-configured via radio resource control signaling from the wireless communications network.

13. The method of claim 1, wherein the first logical channel relates to critical machine-type communications, or ultra-reliable low-latency communications.

14. A terminal device for a wireless communication network, the terminal device being configurable with a plurality of transmission time intervals and comprising processing circuitry and a non-transitory computer-readable medium storing instructions which, when executed by the processing circuitry, cause the terminal device to:
determine a maximum transmission time interval associated with a first logical channel of a plurality of logical channels; and
responsive to a determination that the maximum transmission time interval associated with the first logical channel is less than a first transmission time interval associated with first radio resources, transmit a scheduling request message to the wireless communication network, the scheduling request message being configured according to a second transmission time interval of the plurality of transmission time intervals, wherein the second transmission time interval is shorter than the first transmission time interval.

15. The terminal device of claim 14, wherein the non-transitory computer-readable medium further stores instructions which, when executed by the processing circuitry, cause the terminal device to receive a first grant message from the wireless network, prior to said determining, the first grant message indicating the first radio resources.

16. The terminal device of claim 14, wherein the non-transitory computer-readable medium further stores instructions which, when executed by the processing circuitry, cause the terminal device to:
receive a second grant message from the wireless communication network, subsequent to transmitting the scheduling request, the second grant message indicating second radio resources on which the terminal device can transmit one or more wireless messages, the second radio resources being configured according to a transmission time interval shorter than the first transmission time interval; and
transmit data using the second radio resources.

17. The terminal device of claim 16, wherein the second radio resources are configured according to the second transmission time interval.

18. The terminal device of claim 14, wherein the non-transitory computer-readable medium stores instructions which, when executed by the processing circuitry, cause the terminal device to transmit the scheduling request message via a short control channel.

19. The terminal device of claim 14, wherein the first radio resources comprise radio resources for the transmission of one or more sidelink messages to another terminal device.

* * * * *

UNITED STATES PATENT AND TRADEMARK OFFICE
CERTIFICATE OF CORRECTION

| | |
|---|---|
| PATENT NO. | : 11,388,746 B2 |
| APPLICATION NO. | : 16/923292 |
| DATED | : July 12, 2022 |
| INVENTOR(S) | : Dudda et al. |

Page 1 of 1

It is certified that error appears in the above-identified patent and that said Letters Patent is hereby corrected as shown below:

In the Specification

In Column 11, Line 65, delete "III" and insert -- TTI --, therefor.

Signed and Sealed this
Fourteenth Day of March, 2023

Katherine Kelly Vidal
*Director of the United States Patent and Trademark Office*